INVENTORS:
Edward J. Miller, Jr.
George A. Prell
By Mueller & Aichele
Attorney

INVENTORS:
Edward J. Miller, Jr.
George A. Prell
By Mueller, & Aichele
Attorney

United States Patent Office 3,408,584

Patented Oct. 29, 1968

3,408,584

SELF-EXCITED LINEAR DC AMPLIFIER HAVING A BRIDGE INPUT PORTION

Edward J. Miller, Jr., Tempe, and George A. Prell, Phoenix, Ariz., assignors to Motorola, Inc., Chicago, Ill., a corporation of Illinois Filed Oct. 14, 1963, Ser. No. 315,997
6 Claims. (Cl. 330—9)

ABSTRACT OF THE DISCLOSURE

An AC symmetrical bridge network having a varactor diode in each of two legs in series connection with a center tapped transformer input forming the two other legs of the bridge. Two capacitors couple the transformer to the varactor diodes. An AC amplifier amplifies the signal from the junction of the two varactor diodes and feeds back the AC signal to the center tapped transformer. This loop connection forms an oscillator. When the bridge is unbalanced, the amplitude of the oscillations increases. A DC feedback including a DC amplifier is provided which tends to re-balance the bridge by adjusting the voltage across the diodes. Perfect bridge balance is never reached.

Figure 1:
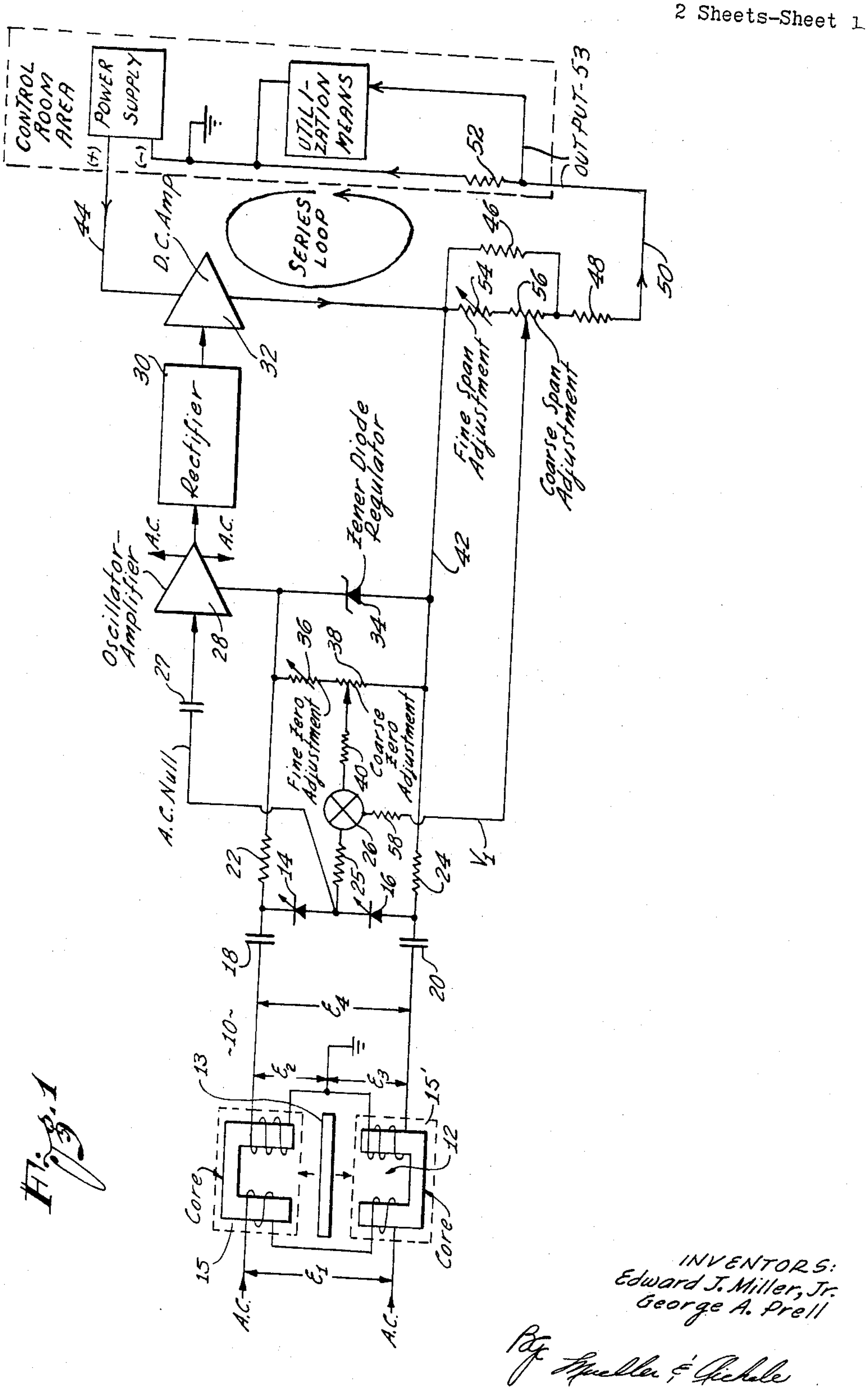

The present invention relates to amplifier systems, and it relates more particularly to an improved measurement type of amplifier which is capable of providing an output which is precisely related to a variable input introduced thereto.

In the embodiment to be described, the improved amplifier is incorporated in the transmitter of an industrial process control system. The amplifier includes a bridge network of the type described in copending application Ser. No. 316,012, filed Oct. 14, 1963, and now Patent 3,283,239 filed in the name of Charles J. Swartwout et al. The aforesaid bridge network incorporates a transducer which, in turn, incorporates a variable transformer, the core of which is mechanically coupled to sensing elements in the transducer which sense variations in the particular condition which is to be monitored by the control system.

The basic input to the amplifier to be described, therefore, is the motion of the core or armature of the aforesaid variable transformer. In a particular industrial process control system in which a constructed embodiment of the invention is used, the variable transformer is incorporated in the transducer, and the armature of the transformer is moved by the transducer sensing elements precisely as a function of input pressure or differential pressure.

This motion of the aforesaid armature causes the bridge to become unbalanced, as described in the aforesaid copending application, and the amplifier of the invention responds to a resulting alternating current error signal from the bridge to develop a direct current feedback for the bridge.

The bridge includes voltage-responsive variable capacitance diodes, generally known as varactors and these respond to the direct current feedback to return the bridge automatically to the balanced condition. This bridge rebalancing operation by the amplifier of the invention is carried out without moving parts, and it provides a precise electrical output which is a direct function of the mechanical input.

As will be described, the improved amplifier system of the present invention includes high gain alternating current amplifier stages and high gain direct current amplifier stages. An alternating current positive feedback loop is provided from the alternating current amplifier output back to the variable transformer. Under normal conditions, the bridge is slightly unbalanced so that a low amplitude alternating current error signal is supplied to the alternating current amplifier. This signal is amplified and fed back to the bridge. The alternating current amplifier stages therefore serve, not only as a bridge balance error detector, but also to supply the alternating current excitation to the bridge.

An improved industrial process control system is described, for example, in copending application Ser. No. 315,940, filed Oct. 14, 1963, and assigned to the assignee of this application. In the described system, the aforementioned transducer is provided at the process area and it responds to changes in a particular variable in the industrial process to be controlled. The transducer causes the transmitter amplifier in which it is incorporated to develop an electric signal having variations indicative of the changes in the monitored variable of the industrial process.

The signal from the transmitter is transmitted, in the system described in the copending application, as a direct current signal to a control room area. The control room area may be adjacent the process area, or at a remote location. The direct current signal is processed at the control room area, and it is utilized in the control room to control indicator and recorder instruments. The direct current control signal is also applied to an appropriate control unit in the control room to enable that unit to develop a further control signal. The further control signal is sent back to the process area, where it is used to control a particular instrumentality in the process.

The present invention is concerned with a measurement bridge control oscillator-amplifier type of system such as described above, and which is particularly adapted for use in such an industrial process control system for the transmission of signals from the process area to the control room area. This is because the oscillator-amplifier to be described is especially adaptable for use in conjunction with the above described measurement bridge network. This bridge network is capable of being conveniently controlled by the aforesaid transducer and of, in turn, exerting a control in the operation of the amplifier.

The amplifier to be described is also especially adaptable for use in the aforesaid environment in that it is conceived and constructed for use with a two-wire line between the process area and the control room. This line not only carries the direct current signal from the transmitter to the control room, but also carries direct current exciting power to the transmitter from a common power supply in the control room.

An object of the invention is to provide an improved amplifier system which is capable of responding to an applied input and of providing an electrical output which is an accurate direct function of the input.

Another object of the invention is to provide such an improved amplifier system which finds particular utility in industrial process control systems, and which permits a two-wire transmission circuit to be used in such a control system.

A feature of the invention is the provision of an amplifier which permits the use of a measurement bridge network incorporating voltage-responsive variable capacitance elements, and incorporates high gain amplifier stages necessary for developing the direct current signal required for the accurate balancing of the measurement bridge network.

Another feature of the invention is the provision of such an amplifier which is particularly constructed to operate in conjunction with a two-wire transmission line.

Another feature of the invention is the provision of such an amplifier which is constructed to operate independently of line resistance in the aforesaid two-wire line, so as to obviate any necessity for the adjustment of line resistance in the installation of the amplifier in such a transmitter.

Still another feature of the invention is the provision of such an improved amplifier which, as noted, is conceived and constructed to operate directly from a common power supply at the control room area.

The oscillator-amplifier system of the invention supplies alternating current to the aforesaid measurement bridge network, as mentioned above, and it also acts as a bridge-balance error detector. The measurement bridge network, as will be described, is balanced by a direct current feedback voltage which is developed across a precision feedback resistance in the main direct current signal current path of the system. Since all the transmitter current flows through the feedback resistor, a precise measurement of the transmitter output is provided. This direct current voltage is applied to the junction of a pair of voltage-variable capacitors which, as will be described, are included in the measurement bridge network. The system to be described includes a high-gain alternating current oscillator-amplifier and a high-gain direct current amplifier which are necessary accurately to balance the measurement bridge.

Zero is adjusted in the system to be described by setting the initial direct current bias at the variable capacitor junction of the bridge to a selected value. In the system to be described, the feedback voltage is negative with respect to the amplifier common reference potential, and the zero adjustment potential positive. The feedback voltage is summed with the zero-adjusted positive bias to give a positive signal voltage for the bridge.

A span control is provided in the amplifier system to be described by the provision of manually adjustable potentiometers across the aforesaid feedback resistance. This means that all the necessary adjustments of the system may be carried out by electrical rather than mechanical controls. This permits suitable external control of the system with the housing thereof intact.

Yet another feature of the invention therefore, is the provision of such an improved amplifier for use in the transmitter of an industrial process control system, and which is constructed so that all necessary controls are effectuated electrically, so that the system can be controlled with the housing intact so as to be safe, even when installed in a hazardous atmosphere.

The principal objects and advantages of the invention therefore are to provide an improved measurement bridge amplifier system for particular use in the two-wire type of industrial process control system; and a system which is precise and accurate in its operation, in which all the controls are achieved electrically so that the system is relatively simple and inexpensive, and so that units incorporating the system may be relatively light and capable of intrinsically safe operation and adjustment externally of the units in hazardous atmospheres susceptible to explosion.

Figure 2:
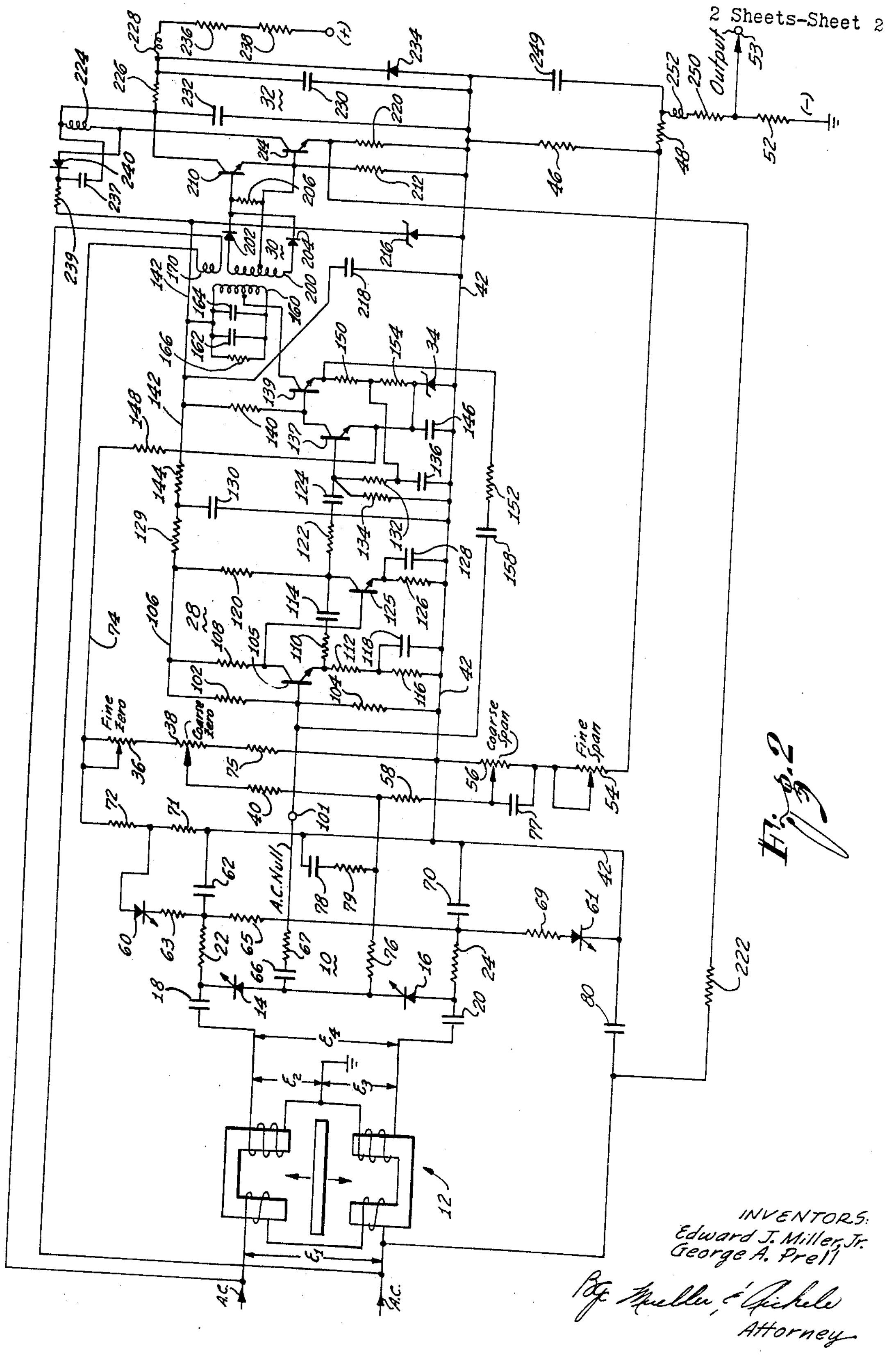

Other features, objects and advantages of the invention will become apparent from a consideration of the following description, when the description is taken in conjunction with the accompanying drawings, in which:

FIGURE 1 is a schematic representation illustrating in block and circuit form one embodiment of the improved amplifier of the invention; and FIGURE 2 is a circuit representation of one embodiment of the amplifier.

As mentioned above, the amplifier system to be described incorporates a solid state measurement bridge network and associated high gain alternating current and direct current amplifier stages. This bridge network is designated as 10 in FIGURE 1, and it is described and claimed in copending application Ser. No. 316,012, filed Oct. 14, 1963, and now Patent 3,283,239.

The bridge network includes a variable transformer 12, and it also includes a pair of voltage sensitive capacitors 14 and 16. The capacitors 14 and 16 are actually a particular type of diode, known to the art as "varactor." These diodes respond to voltage variations to exhibit corresponding changes in capacity.

The variable transformer 12 may be incorporated in a sensing device, such as in a pressure differential transducer, which constitutes a part of the transmitter. Such a transducer is described and claimed, for example, in copending application Ser. No. 315,821, filed Oct. 14, 1963, and now Patent 3,277,719. The transducer described in the copending application incorporates a variable transformer such as the transformer 12. Relative motion between the stationary cores and the movable armature 13 in response to external force applied to the transducer results in a change in the inductances of the two halves 15 and 15' of the transformer circuit. This, in turn, produces corresponding changes in the amplitude ratio of the secondary signals $E_2$ and $E_3$, which produces a corresponding unbalancing of the bridge 10.

The center tap of the secondary winding of the transformer 12 is shown as being connected to a point of reference potential, such as ground, and the signals $E_2$ and $E_3$ appear on either side of the center tap. The secondary winding is connected to a pair of direct current isolating capacitors 18 and 20. The capacitors, in turn, are connected to a corresponding pair of alternating current isolating resistors 22 and 24. The junction of the capacitor 18 and resistor 22 is connected to the varactor 14, and the junction of the capacitor 20 and resistor 24 is connected to the varactor 16.

The varactors 14 and 16 are connected together, and through an alternating current isolation resistor 25 to a summing network 26. The junction of the varactors also is coupled through a capacitor 27 to the input of an alternating current oscillator-amplifier 28. The alternating current output from the amplifier 28 is fed back to the primary of the variable transformer 12. The output from the oscillator-amplifier 28 is rectified in a rectifier 30, and the resulting direct current signal is amplified in a direct current amplifier 32.

The resistors 22 and 24 are connected to a Zener diode 34 which serves as a voltage regulator. A pair of potentiometers 36 and 38 are connected across the Zener diode. The potentiometer 36 provides a fine zero adjustment, and the potentiometer 38 provides a coarse zero adjustment.

The arm of the potentiometer 38 is connected to the DC summing point 26 through a DC summing resistor 40. The Zener diode 34 is connected in the circuit of the amplifier 28, and the anode of the Zener diode regulator is connected to a common lead 42. The lead 42 also serves as a common lead for the direct current amplifier 32.

The output circuit of the direct current amplifier 32 is connected to a lead 44, and through a precision feedback resistor 46 and a resistor 48 to a lead 50. The leads 44 and 50 constitute a two-wire transmission line, which extends from the process area to the control room area. The source of direct current exciting potential for the system may be located in the control room area. The wire 44 is connected to the positive terminal of the source, and the wire 50 is connected to an output terminal 53 and through a precision resistor 52 to the grounded negative terminal of the source. An output control voltage is developed across the resistor 52. The potential source in a constructed embodiment of the invention is a 24-volt source, and the output control voltage varies in a range of from 1–5 volts direct current. The amplifier draws 4–20 milliamperes from the source.

A potentiometer 54 and a potentiometer 56 are connected across the precision resistor 46. The potentiometer 54 constitutes a fine span adjustment for the system, and the potentiometer 56 constitutes a coarse span adjustment. The arm of the potentiometer 56 is connected through a DC summing resistor 58 to the summing point 26.

The variable transmormer in the transducer head forms half of the measurement bridge network 10. The other half of the bridge consists of the two voltage-variable capacitors (varactors) 14 and 16. A voltage proportional to the transmitter output appears across the precision feedback resistor 46, and the potentiometers 54 and 56. This voltage is fed back to the voltage-variable capacitors 14 and 16 by way of the summing network 26, and serves to rebalance the bridge. The solid state rebalancing circuit is highly stable, and it is free from vibration effects normally associated with mechanical rebalancing systems.

As mentioned above, the transformer 12 is excited by the alternating current derived from the oscillator-amplifier 28. If the movable core is symmetrically disposed with respect to the two portions of the secondary, the voltage $E_2$ will equal the voltage $E_3$. If the armature is moved away from the neutral position (as the transducer senses changes in the variable) there will be a change in the ratio of the voltages $E_2$ and $E_3$. For limited core travel, the ratio between the voltages $E_2$ and $E_3$ will be a linear function of core travel. This ratio will be unaffected by the magnitude of the alternating current feedback voltage $E_1$.

The voltage $E_4$ equals the sum of the voltages $E_2$ and $E_3$. For limited core travel, the voltage $E_4$ will be essentially constant in amplitude assuming a constant input amplitude $E_1$. The voltage $E_4$ is the alternating current excitation on the other two legs of the bridge comprising the voltage-variable capacitors (varactors) 14 and 16.

The introduction of a direct current input voltage ($V_1$) through the resistor 58 (summed with the voltage derived through the resistor 40 from the zero adjustment potentiometer 38) to the junction of the varactors 14 and 16 results in a change in relative capacity of the varactors as a function of the amplitude of this voltage. That is, an increase in the voltage ($V_1$) causes one of the varactors 14 and 16 to increase its value while the other decreases in value, thus causing a change in the capacitance ratio. The voltage ($V_1$) can be adjusted so that the alternating current bridge output applied to the oscillator-amplifier 28 can be brought back to a null for any position of the movable core.

The operation of the bridge network is described in more detail in copending application Ser. No. 316,012, filed Oct. 14, 1963, and now Patent No. 3,283,239.

As mentioned above, the movable armature of the transformer 12 is moved as a function of variations in the variable being sensed by the transducer in which the transformer 12 is incorporated. In the particular embodiment described in the copending application Ser. No. 315,-821, filed Oct. 14, 1963, and now Patent No. 3,277,719, the armature is moved precisely as a function of differential pressure.

The resulting unbalance of the bridge, causes a variation in the amplitude of the alternating current output signal developed by the amplifier 28. This, in turn, causes a variation in the current drawn by the direct current amplifier 32 through the feedback resistor 46. The resulting feedback voltage ($V_1$) applied to the varactors 14 and 16, causes the direct current input to the varactors to be automatically varied until the balance position of the bridge is again established.

The rebalancing circuit provides a precise electrical output in the form of a direct current signal drawn through the conductor 50, and through the precision resistor 52 at the control room area. As mentioned, this rebalancing is accomplished without the use of any moving parts.

The zero position of the bridge can be adjusted by adjustments of the coarse potentiometer 38 and fine potentiometer 36. In addition, the span can be adjusted by adjustment of the fine potentiometer 54 and coarse potentiometer 56.

It is apparent that substantially all the transmitter output direct current flows through the precision feedback resistor 46, so that the voltage developed across that resistor is a precise measure of the transmitter output. Also, the use of the span adjustment potentiometer 54 and 56, permit any desired portion of the voltage across the resistor 46 to be fed back to the bridge network, so that a convenient span adjustment is provided.

The feedback voltage ($V_1$) is negative with respect to the common amplifier lead 42. This voltage is summed with a fixed positive voltage derived from the zero adjustment potentiometers 36 and 38, to render the voltage applied to the varactors 14 and 16 positive with respect to the lead 42.

The alternating current amplifier 28 and the direct current amplifier 32 are high gain amplifiers so that the bridge 10 may be accurately balanced.

The amplifier system of FIGURE 1, therefore, produces signal currents in the loop including the wires 44 and 50, which currents correspond precisely and as a direct function of the mechanical input of the system. The resistance of these leads has no material effect on the operation of the transmitter, because in each instance the direct current amplifier 32 draws sufficient current through the loop to rebalance the bridge. Therefore, there is no necessity to make allowances in the transmitter circuit for the resistance of the two-wire line between the transmitter and the control room. Also, the particular circuit of FIGURE 1 is such that the transmitter in the process area may operate directly from a common power supply in the control room area.

The actual circuit of one embodiment of the invention is shown in FIGURE 2.

The bridge network 10 is shown in more detail in FIGURE 2, and it includes a pair of additional diodes, such as the diodes 60 and 61. These diodes may be, for example, silicon diodes, varactors, and the like. The diodes 60 and 61 are included in the bridge network for temperature compensation purposes, as described in more detail in copending application Ser. No. 316,012, filed Oct. 14, 1963, and now Patent 3,283,239.

The diode 60 is connected to the junction of the resistor 22 and a capacitor 62 through a resistor 63. The capacitor 18 may have a capacity of .01 microfarad, the resistor 22 may have a resistance of 100 kiloohms, the resistor 63 may have a resistance of 31.6 kiloohms, and the capacitor 62 may have a capacity of .01 microfarad.

The junction of the resistor 22 and capacitor 62 is connected through a resistor 65 to the junction of resistor 24 and capacitor 70. The varactors 14 and 16 are coupled to the alternating current null line through a capacitor 66 and a resistor 67. The capacitor 66 may have a capacity of .001 microfarad, the resistor 67 may have a resistance of 56.2 kiloohms, and the resistor 65 may have a resistance of 215 kiloohms.

The diode 61 is connected through a resistor 69 to the junction of the resistor 24 and a capacitor 70. The capacitor 20 may have a capacity of .01 microfarad, the resistor 24 may have a resistance of 100 kiloohms, the resistor 69 may have a resistance of 46.4 kiloohms, and the capacitor 70 may have a capacity of .01 microfarad. The capacitors 62 and 70 are connected to the common line 42 of the amplifiers 28 and 30. This line is connected through a pair of resistors 71 and 72 to a lead 74. The resistors 63 and 69 are included in the circuit so as to reduce the compensating bias changes imparted by the diodes 60 and 61 to exactly the ranges required to compensate precisely for the characteristic changes of the varactors 14 and 16 with temperature. The resistors 63 and 69 also serve to compensate for changes in the values of resistors 72 and 71 with temperature, and they have mutually different resistance values for that purpose.

The fine zero adjustment potentiometer 36 is connected to the lead 74. The junction of the resistors 71 and 72 is connected to the varactor 60. The resistors 71 and 72 serve as a voltage divider, and they permit adequate voltage to be applied from a common source to the zero adjustment potentiometers 36 and 38 without excessive voltage being applied to the bridge 10. The resistor 71 may have a resistance of 33.2 kiloohms, and the resistor 72 may have a resistance of 13.3 kiloohms. The coarse zero adjustment potentiometer 38 is connected to the common lead 42 through a resistor 75.

The resistors 40 and 58 are connected through a resistor 76 to the junction of the varactors 14 and 16. The fine zero adjustment potentiometer 36 may have a resistance of 500 ohms, and the coarse zero adjustment potentiometer 38 may have a resistance of 25 kiloohms. The resistor 75 may have a resistance of 33.2 kiloohms, the coarse span adjustment potentiometer 56 may have a resistance of 25 kiloohms, and the fine span adjustment potentiometer 54 may have a resistance of 500 ohms. The resistor 58 may have a resistance of 249 kiloohms, the resistor 40 may have a resistance of 178 kiloohms, and the resistor 76 may have a resistance of 100 kiloohms.

A stabilizing capacitor 77 is connected to the movable arm of the coarse span adjustment potentiometer 56. This capacitor may have a capacity of .022 microfarad. A capacitor 78 and a series resistor 79 are connected between the lead 42 and the junction of the resistors 58 and 76. The resistor 79 and the capacitor 78 form a resistance-capacitance stabilizing network for the bridge loop circuit. The capacitor 78 may have a capacity of .022 microfarad, and the resistor 79 may have a resistance of 10 kiloohms. The diode 61 is connected to the common amplifier lead 42. The transformer primary is AC grounded through capacitor 80. If the other side of this transformer is grounded and the secondary leads to capacitors 18 and 20 are reversed, the DC output may be made to decrease with pressure. This reverse action is sometimes desirable in a process control transmitter and is an important feature of this unit.

The alternating current null line is connected to an input terminal 101 of the alternating current amplifier 28. The amplifier 28 is a usual alternating current amplifier with internal degenerative feedback being provided for stabilizing purposes. This terminal is connected to the junction of a pair of voltage-divider biasing resistors 102 and 104, and to the base electrode of a transistor 105. The resistor 102 is connected to a lead 106, and the resistor 104 is connected to the common amplifier lead 42. The resistors 102 and 104 may each have a resistance, for example, of 220 kiloohms.

The collector of the transistor 105 is connected to a resistor 108, and to the base electrode of a transistor 125. The resistor 108 may have a resistance, for example, of 27 kiloohms, and it is connected to the lead 106. The emitter of the transistor 105 is connected to a feedback resistor 110 and to a resistor 112. The resistor 110 may have a resistance, for example, of 27 kiloohms, and it is connected to a capacitor 114. The resistor 110 and capacitor 114 form an alternating current degenerative feedback circuit for alternating current gain stability.

The capacitor 114 may have a capacity, for example, of .47 microfarad, and it is connected to the collector of the transistor 125. The resistor 112 may have a resistance of 270 ohms, for example, and it is connected to a resistor 116. The resistor 116 may have a resistance, for example, of 39 kiloohms, and it is connected to the common amplifier lead 42. The resistor 116 is shunted by a capacitor 118 having a capacity, for example, of .47 microfarad.

The collector of the transistor 125 is connected through a resistor 120 to the lead 106. The resistor 120 may have a resistance, for example, of 27 kiloohms. The collector of the transistor 125 is also connected to a resistor 122. The resistor 122 is connected to an alternating current coupling capacitor 124 which, in turn, is connected to the base of a transistor 137. The resistor 122 may have a resistance of 100 ohms, and the capacitor 124 may have a capacity of .47 microfarad.

The emitter of the transistor 125 is connected to a resistor 126. The resistor 126 may have a resistance of 220 kiloohms. This resistor is connected to the lead 42. A capacitor 128 is shunted across the resistor 126. The capacitor 128 has a capacity, for example, of .47 mircofarad. A limiting resistor 129 is connected to the lead 106 for intrinsic safety purposes. This resistor may have a resistance of 100 ohms. A capacitor 130 is connected to the resistor 129 and to the lead 42. The capacitor 130 may have a capacity of 4.7 microfarads.

The base of the transistor 137 is connected to a direct current feedback resistor 132 and to a resistor 134. The resistor 134 has a resistance of 52.2 kiloohms, and it is connected to the lead 42. The feedback resistor 132 has a resistance of 17.8 kiloohms, and it is connected to a capacitor 136. The capacitor 136 is connected to the lead 42, and it has a capacity, for example, of 15 microfarads.

The collector of the transistor 137 is connected to a resistor 140. The resistor 140 has a resistance of 12.1 kiloohms. The resistor is connected to a lead 142. A decoupling resistor 144 is connected to the resistor 129 and to the lead 142. The resistor 144 may have a resistance, for example, of 15 kiloohms.

The emitter of the transistor 137 is connected to a capacitor 146 which, in turn, is connected to the lead 42. The capacitor 146 has a capacity, for example, of 15 microfarads. The emitter of the transistor 137 is also connected to a resistor 148 which is connected to the lead 74 to supply the regulated direct current bias voltage to the bridge network 10 from the Zener diode 34. The resistor 148 has a resistance, for example, of 100 ohms.

The collector of the transistor 137 is connected to the base of a transistor 139. The transistors 105, 125, 137 and 139 are all included in the high gain alternating current oscillator-amplifier 28. The emitter of the transistor 139 is connected to a resistor 150 and to a resistor 152. The resistor 150 has a resistance of 9.65 ohms, for example, and is connected to a second resistor 154. The resistor 154 may have a resistance of 2.5 kiloohms, for example. This resistor is connected to the cathode of the Zener diode 34, the cathode of the Zener diode being further connected to the capacitor 146 and to the resistor 148. The anode of the Zener diode 34 is connected to the lead 42.

The resistor 132 connects the junction of the resistors 150 and 154 back to the base of the transistor 137 to provide a degenerative feedback circuit for regulating the current through the Zener diode 34.

The resistor 152 has a resistance, for example, of 499 kiloohms, and is connected to a capacitor 158. The capacitor 158 has a capacity, for example, of .047 microfarad. This capacitor is connected back to the base of the transistor 105 to constitute an alternating current degenerative feedback circuit for stabilizing the current gain of the oscillator-amplifier 28. This circuit picks current off the emitter of the transistor 139 of the final stage of the amplifier and feeds it back to the base of the transistor 105 of the first stage. The degenerative feedback circuit also serves to stabilize the input impedance of the amplifier in that it makes the input impedance of the base of the transistor 105 virtually to the ground level.

The collector of the transistor 139 is connected to a tap on an inductive winding 160. The winding 160 is shunted by a pair of capacitors 162 and 164, and by a resistor 166. The resistor 166 may have a resistance of 17.8 kiloohms, and each of the capacitors 162, 164 may have a capacity of .0091 microfarad. The capacitors 162, 164 and the inductive winding 160 form a parallel resonant tuned tank circuit for the oscillator-amplifier 28. This tank circuit is connected to the lead 142. The tank circuit is tuned to a selected frequency, such as 30 kilocycles. Oscillations at that frequency are set up in the system.

An inductive winding 170 is inductively coupled to the winding 160, and the winding 170 is connected back to the primary of the variable transformer 12. This winding supplies alternating current to the bridge network 10, and also serves to establish an oscillatory condition in the system.

The null condition in the system is set by the setting of the "fine" and "coarse" zero adjustment potentiometers 36 and 38. This provides for a low amplitude alternating current signal at the input terminal 101. This signal is amplified in the alternating current amplifier 28 and fed back to the bridge by the above-described positive feedback loop. Then, any variations in the movable core of the transformer 12 from the null condition, as the transducer responds to the monitored conditions, results in a variation in the amplitude of the alternating current signal at the input terminal 101. The alternating current oscillator-amplifier 28 develops, therefore, an amplified alternating current signal, having precise amplitude which is a direct function of the variation sensed by the transducer. The amplified alternating current signal is rectified and amplified in the direct current amplifier 32 and used to rebalance the bridge 10.

A winding 200 is inductively coupled to the inductive winding 160 so as to couple the alternating current amplifier 28 to the direct current amplifier 32. The winding 200 is connected to the anode of a pair of diodes 202, 204 in the rectifier 30. The center tap of the winding 200 is connected to a resistor 206. The cathodes of the diodes 200 and 204 are connected together, and to the other side of the resistor 206. These cathodes are also connected to the base of an NPN transistor 210. The resistor 206 may have a resistance, for example, of 22 kilo-ohms. The rectifier circuit 30 of the diodes 202 and 204 is a full wave rectifier, and the circuit acts as a frequency doubler. This circuit serves to prevent any interaction between the input and output of the system. The transistor 210 constitutes the first stage of the direct current amplifier 32.

The emitter of the transistor 210 is connected to the center tap of the winding 200, and the emitter is also connected to a load resistor 212 and to the base of an NPN transistor 214. This latter transistor constitutes the second stage of the direct current amplifier 32. The load resistor 212 may have a resistance, for example, of 4.7 kiloohms, and it is connected to the lead 42. A Zener diode 216 is connected between the lead 142 and the lead 42, for voltage regulating purposes. This diode may be shunted by a filter capacitor 218 which, for example, may have a capacitance of 4.7 microfarads.

The emitter of the transistor 214 is connected to a load resistor 220 which, in turn, is connected to the common amplifier lead 42. The load resistor 220 may have a resistance of 4.7 kiloohms. The emitter of the transistor 214 is also connected to a feedback resistor 222 which is connected back to the variable transformer 12 of the bridge 10. The resistor 222 may have a resistance of 56 kiloohms. This resistor provides a stabilizing degenerative feedback, proportional to the output direct current, to the bridge.

The collector of the transistor 210 is connected to one side of an inductance coil 224 and to a resistor 226. The resistor 226 is connected to a 100 microhenry choke coil 228, and to a capacitor 230. The choke coil 228, and a similar choke coil in the negative lead serve to render the system immune to stray radiation pick-up. The junction of the coil 224 and resistor 226 is connected to a capacitor 232. The capacitors 230 and 232 are connected to the lead 42.

The choke coil 228 is connected through a pair of intrinsic safety resistors 236 and 238 to the positive terminal of the power supply. These intrinsic safety resistors are discussed in more detail in copending application Ser. No. 315,940, filed Oct. 14, 1963, and assigned to the assignee of this application. As discussed in the copending application, and as mentioned above, the power supply may be located in the control room, as may the safety resistors 236 and 238. As also described in the copending case, the safety resistors function as current limiting resistors, and they serve to limit the current to a safe level, in the presence of short circuits in the system.

A diode 234 has its cathode connected to the junction of the resistor 226 and coil 228 and has its anode connected to the lead 42. The resistor 226 may have a resistance of 100 ohms, the capacitor 230 may have a capacity of .22 microfarad, and the capacitor 232 may have a capacity of 27 microfarads.

The coil 224 is included in the voltage boost circuit which is described in more detail in copending application Ser. No. 316,033, filed Oct. 14, 1963, assigned to the assignee of this application, and now abandoned. This coil is connected to a filter capacitor 237 which, in turn, is connected to a resistor 239 and to the cathode of a rectifying diode 240. The anode of the diode 240 is connected to the collector of the transistor 214. The resistor 239 is connected to the lead 142. The capacitor 237 may have a capacity of 4.7 microfarads, and the resistor 239 may have a resistance of 1.8 kiloohms.

As described in detail in the copending application Ser. No. 316,033, filed Oct. 14, 1963, assigned to the assignee of this application, and now abandoned, the signal from the full wave rectifier frequency doubler 30 is fed to the base of the transistor 210, and the emitter current of the transistor 210 drives the transistor 214. The collector current of the transistor 214 flows through the inductance coil 224 which provides energy storage and flyback action, as described in the copending case.

The capacitor 232 is an energy storage capacitor which supplies energy to the coil 224 during the intervals when the transistor 214 is conductive. The diode 240 rectifies the voltage which appears across the coil 224 during the interval when the transistors 210 and 214 are nonconductive and when the field of the coil collapses. The resulting rectified voltage is smoothed by the filter capacitor 237 and applied to the amplifier circuit.

The capacitor 230 and choke coil 228 form a radio frequency filter for attenuating any spurious signal which might be imposed on the positive power lead. The capacitor 249 and coil 252 form a similar radio frequency filter for any spurious signals which might appear on the negative lead.

The lead 42 is connected to the negative side of the power supply through the resistors 46, 48 and 52. The output terminal 53 is connected to the junction of the resistors 48 and 52. As also mentioned above, and in the copending application Ser. No. 315,940, filed Oct. 14, 1963, and assigned to the assignee of this application, the precision resistor 52 may be located at the control room area. The resistor 46 may have a resistance of 252.5 ohms, the resistor 48 may have a resistance of 52.6 ohms, and the resistor 52 may have a resistance of 250 ohms.

A capacitor 249 is shunted across the resistors 46 and 48. This capacitor may have a capacity, for example, of 122 microfarads. An intrinsic safety limiting resistor 250 and a choke coil 252 may be interposed in series between the resistors 48 and 52. The safety resistors may be located at the control room. The resistor 48 may have a resistance, for example, of 60 ohms, and the choke coil may have an inductance of 100 microhenries.

The alternating current signal applied to the input terminal 101 is amplified in the alternating current amplifier 28, as noted, and it appears in an amplified form in the output circuit of a transistor 139. The amplified signal is rectified in the rectifier circuit 30, and the rectified signal is applied to the direct current amplifier 32, which is formed by the circuit of the transistors 210 and 214. The rectified signal is amplified in the direct current amplifier so that a predetermined direct current signal current is caused to flow through the resistors 52, 48 and 46. This current flow, as explained in conjunction with the schematic representation of FIGURE 1, normally flows through the two-wire circuit 44 and 50, when the power supply and the precision resistor 52 are located at the control room.

Any variation of the transducer varies the inductance of the upper and lower halves 14 and 15 of the center-tapped secondary of the transformer 12, so as to unbalance the bridge network 10. The unbalance of the bridge network amplitude modulates the alternating current error signal applied to the alternating current amplifier 28. This alternating current error signal is fed back to the bridge as an excitation voltage therefor, and it also is rectified and the resulting direct current signal is amplified in the direct current amplifier 32. This causes the direct current amplifier 32 either to increase or decrease the direct current drawn through the resistors 52, 48 and 46. This increase or decrease causes the voltage across the feedback resistor 46 to vary, so that the direct current voltage applied to the varactors 14 and 16 varies. The capacitance of the varactors 14 and 16 changes accordingly in a direction to balance the bridge 10, and to return the alternating current signal applied to the amplifier 28 to the null point. The net voltage fed back to the bridge is controlled electrically for span control purposes; and the base voltage level is also controllable electrically for zero adjustment purposes.

Therefore, the direct current flowing in the resistors 46, 48 and 52 represents the current required to produce the required voltage to reset the bridge. This direct current is a precise direct function of the movements of the transducer in which the transformer 12 is incorporated.

The circuitry of the inductance coil 224, diode 240, and associated filter components 239 and 238, provide a voltage boost for the excitation of the transistors in the amplifier 28. The voltage developed by the voltage boost circuit is added to the power supply voltage, as described and claimed in the copending application Ser. No. 316,033, filed Oct. 14, 1963, assigned to the assignee of this application, and now abandoned. The use of the voltage boost circuit, as described in the copending case, permits a relatively low voltage power supply to be used for efficiency and safety purposes.

The invention provides, therefore, an improved amplifier which is particularly suited for use in conjunction with the solid state measurement bridge 10. Moreover, the improved amplifier of the present invention has particular utility in two-wire transmission systems, such as described above.

The amplifier system of the invention is conceived and constructed, so that variations in a transducer-controlled input, produces corresponding direct current variations in a two-wire line circuit. The system is constructed so that the resulting direct current variations precisely and accurately reflect the variations in the input transducer.

While a particular embodiment of the invention has been shown and described, modifications may be made, and it is intended to cover in the claims all modifications which fall within the scope of the invention.

We claim:

1. An amplifier system including in combination:

a bridge network having AC balanced and unbalanced conditions and including a first portion having first and second arms series-connected together, each arm having electrical means with an electrical characteristic and responsive to a variable effect to alter such electrical characteristic in accordance with said effect for establishing the bridge network in an AC unbalanced condition, and including a second portion having third and fourth series-connected arms with each of said third and fourth arms having a semiconductor device exhibiting an electrical characteristic and each semiconductor device being responsive to an applied direct current voltage for altering its electrical characteristics which alternation affects the AC balance of said bridge, AC means for supplying an alternating current exciting signal across said first portion of said bridge network to cause said bridge to develop from said alternating current exciting signal a modulated amplitude alternating current signal amplitude modified by the AC balanced-unbalanced condition of said bridge network, the greater the unbalance the greater the amplitude of said modulated alternating current signal, an alternating current amplifier having an input portion coupled to said bridge network intermediate said third and fourth arms for receiving and amplifying said amplitude modulated alternating current signal, and supplying such modulated alternating current signal to said AC means for completing an oscillatory circuit, means including rectifying means and a direct current amplifier coupled to said alternating current amplifier for receiving said amplified modulated alternating current signal, an output circuit included in said direct current amplifier including a feedback resistor for developing a direct current feedback voltage thereacross having an amplitude related to the amplitude of said modulated alternating current signal, circuit means including manually-adjustable span control potentiometer means connected in shunt with said feedback resistor and having a tap electrically intermediate ends of said span control potentiometer means and said circuit means being connected across said fourth arm with said tap being connected intermediate said third and fourth arm for applying a direct current voltage to said bridge across said fourth arm for altering the reactive electrical characteristic of the electrical semiconductor device in said fourth arm, to return said bridge toward its AC balanced condition for reducing the amplitude of said modulated alternating current signal, and means supplying a substantially constant voltage magnitude across said second portion for biasing said devices to exhibit said reactive electrical characteristics, and AC coupling means at each remote end of said first and second portions coupling said portions together, and reference potential means connected to said bridge intermediate said first and second legs.

2. The amplifier system defined in claim 1 in which said feedback resistor is included in a series loop circuit extending to a control area.

3. An amplifier system, including in combination:

a bridge network including a first pair of first and second series connected arms each having an electrical device, one electrically similar to the other, and each having a voltage variable capacitance characteristic and responsive to an applied direct current control signal for controlling the balanced-unbalanced condition of said bridge by altering said capacitance characteristic and further including a second pair of series connected third and fourth arms, input circuit means for introducing an alternating current exciting signal across said third and fourth arms of said bridge and including a transformer having a tapped secondary winding having equal portions of said winding included in each of said third and fourth arms, respectively, each with a variable inductance and having a primary winding, means coupled to said transformer for selectively altering said inductance by differing amounts, respectively, for establishing the bridge in an unbalanced condition for modulating said alternating current exciting signal with the bridge unbalance increasing the amplitude of the modulated alternating current signal intermediate said first and second series connected arms, an alternating current amplifier having an AC coupling input portion, means coupling said bridge from between said first and second arms to said alternating current amplifier input portion for introducing said modulated alternating current signal to said amplifier, a direct current amplifier having rectifier means coupled to said alternating current amplifier for receiving said modulated alternating current signal as amplified by said alternating current amplifier, and supplying a rectified signal indicative of the bridge unbalance and including an output circuit in which said rectified signal is supplied, further circuit means in said output circuit for deriving a direct current control signal from said rectified signal and connected to said junction between said first and second arms of said bridge to introduce said direct current control signal thereto for altering the capacitance characteristic so as to return the bridge substantially to the balanced condition, AC coupling means coupling the ends of said first and third arms together and said second and fourth arms together, and means establishing a DC potential at the AC coupled ends of said first and second arms.

4. The amplifier system defined in claim 3 in which said transformer includes a movable armature for controlling the respective inductive coupling between the primary winding thereof and said first and second portions of said secondary winding thereof so as to establish the bridge to the unbalanced condition.

5. A signal translating system having an AC amplifier connected to and supplying an AC signal to a rectifier which supplies rectified AC to a DC amplifier, the DC amplifier having an output circuit with two leads, one lead of which includes a feedback resistor, the improvement including in combination, input means including a portion forming two arms of an electrical bridge network and receiving said AC signal from the AC amplifier thereacross for exciting the bridge network and each arm having an alterable AC electrical characteristic which when altered unbalances the bridge such as to amplitude modulate said AC signal, two electrically responsive impedance means series connected together respectively forming two other arms of the bridge network, capacitance coupling means capacitively coupling the outer extremities of said other legs to said input means arm extremities, an intermediate junction between the electrically responsive impedance means carrying said amplitude modulated AC signal, an electrical connection between said intermediate junction and an input of the AC amplifier for supplying said amplitude modulated AC signal thereto, means connected to said AC amplifier including voltage regulator means for receiving said amplitude modulated AC signal and supplying a DC zero adjustment signal derived from said received AC signal, a summing network connected across said DC feedback resistor for adjusting said electrically responsive impedance means in accordance with alteration of said AC characteristics of said input portion whereby the bridge network is electrically adjusted toward reducing the amplitude of said AC signal and said AC signal being generated in an oscillatory circuit consisting of said AC amplifier and said bridge network.

6. The system of claim 5 wherein said electrically controlled impedance means are voltage variable capacitance diodes, both of which are poled to conduct current in a forward direction from one extremity to another extremity of said other legs.

References Cited

UNITED STATES PATENTS

| | | | |
|---|---|---|---|
| 2,729,396 | 1/1956 | Impey et al. | 328—3 X |
| 2,956,234 | 10/1960 | Olsen | 330—10 |
| 2,995,698 | 8/1961 | Collins | 324—98 X |
| 3,040,157 | 6/1962 | Hukee. | |

ROY LAKE, *Primary Examiner.*

NATHAN KAUFMAN, *Assistant Examiner.*